United States Patent [19]

Yang

[11] Patent Number: 5,055,226
[45] Date of Patent: Oct. 8, 1991

[54] MANUFACTURING METHOD FOR RED PHOSPHOR

[75] Inventor: Junmo Yang, Suwon, Rep. of Korea

[73] Assignee: Samsung Electron Devices Co., Ltd., Hwasung, Rep. of Korea

[21] Appl. No.: 451,224

[22] Filed: Dec. 15, 1989

[51] Int. Cl.$^5$ ............................................. C09K 11/78
[52] U.S. Cl. ............................................. 252/301.4 R
[58] Field of Search ................................. 252/301.4 R

[56] References Cited

U.S. PATENT DOCUMENTS

| | | | |
|---|---|---|---|
| 3,842,012 | 10/1974 | Hoppenbrouwers | 252/301.4 R |
| 4,032,471 | 6/1977 | Luckey | 252/301.4 R |
| 4,801,398 | 1/1989 | Ohno et al. | 252/301.4 R |

FOREIGN PATENT DOCUMENTS 2422883  11/1975  Fed. Rep. of Germany ... 252/301.4 R

Primary Examiner—Jack Cooper
Attorney, Agent, or Firm—Christie, Parker & Hale

[57] ABSTRACT

A manufacturing method for a $Y_2O_3$: Eu red phosphor is disclosed in which yttrium oxide and europium oxide are used, and also a composite flux composed of a mixture of $Na_2CO_3$, NaF and $B_2O_3$ is used. The $Y_2O_3$: Eu red phosphor according to the present invention is uniform in its particle size distribution, has a desirable spherical particle shape, shows a perfect filling state of the layer, and shows a luminance improvement by 4–7% over that of the conventional phosphor.

1 Claim, 2 Drawing Sheets

MANUFACTURING METHOD FOR RED PHOSPHOR

BACKGROUND OF THE INVENTION

The present invention relates to a manufacturing method for a red phosphor composed of europium-activated yttrium oxide (to be called hereinafter "$Y_2O_3$: Eu"), and particularly to a manufacturing method for a $Y_2O_3$: Eu red phosphor in which a composite flux composed of $Na_2Co_3$, NaF and $B_2O_3$ is used in manufacturing the phosphor so that the distribution of the partical size should become uniform, the shape of the particles should become spherical, and the luminesence should be improved.

Conventionally, when manufacturing a $Y_2O_3$: Eu phosphor for use in a projection tube, a composite flux/composed of $Na_2CO_3$, $K_2HPO_4$ and $B_2O_3$, or $H_3BO_3$, NaF and $Na_2CO_3$ was used.

However, the conventional phosphor manufactured based on the above described method was not uniform in its particle shapes, with the result that the manufactured phophor layer showed a lowered luminance.

SUMMARY OF THE INVENTION

The present invention is intended to overcome the above described disadvantage of the conventional technique.

Therefore, it is the object of the present invention to provide a manufacturing method for a $Y_2O_3$: Eu red phosphor, in which a composite flux composed of $Na_2CO_3$, NaF and $B_2O_3$ is used in manufacturing the phosphor, thereby obtaining a phosphor having a uniform distribution of the particle size, a good filling state and an improved luminance.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE INVENTION

Figure 1:
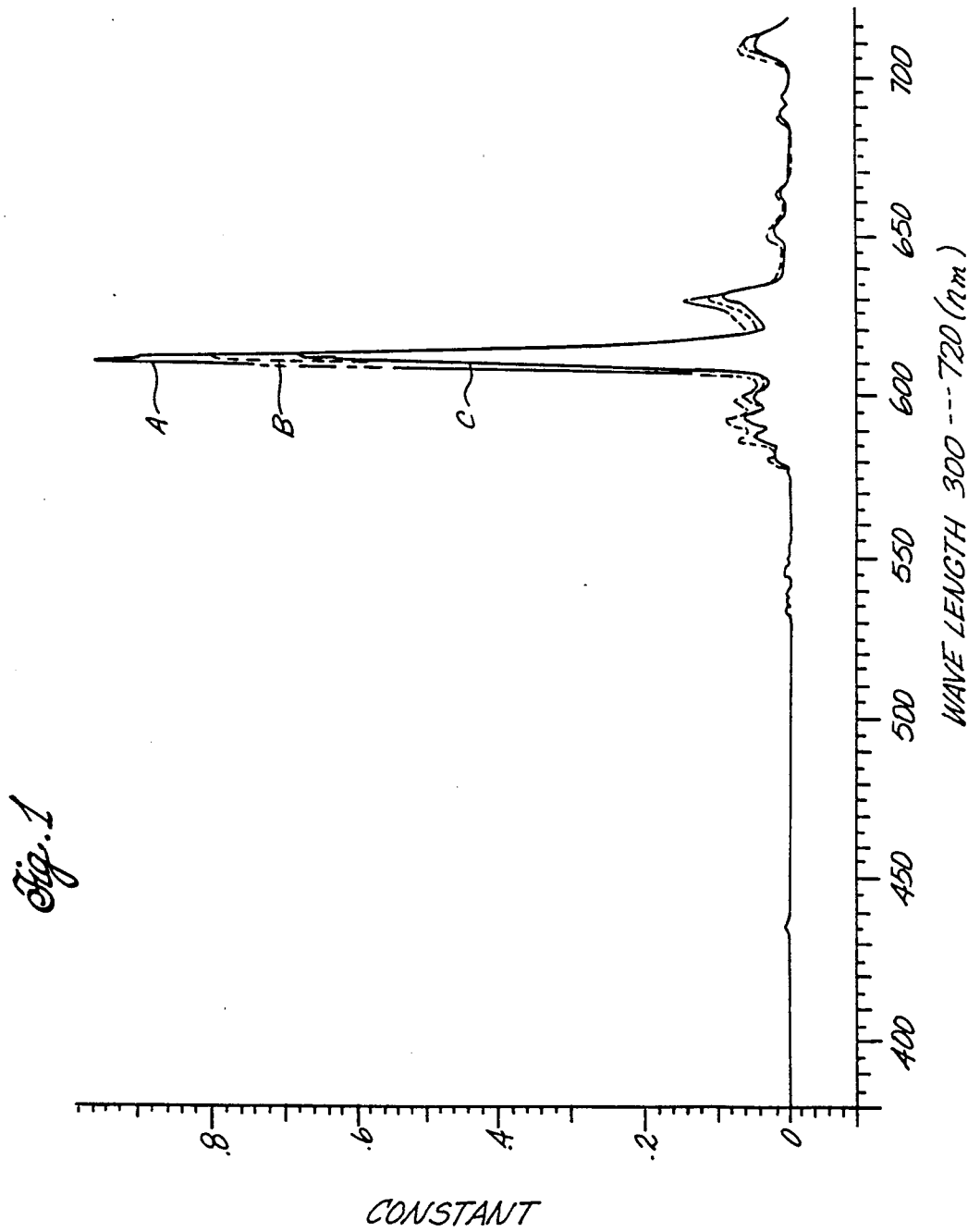
FIG. 1 is a graphical illustration showing the luminescence spectra of the $Y_2O_3$: Eu phosphors.

FIG. 1 is a graphical illustration showing the spectra for the manufactured phosphors, the spectra being measured by means of a P.T.E. (Phosphor test equipment). In this drawing, the graph A represents the spectrum obtained from the phosphor of the present invention using a composite flux composed of $Na_2CO_3$, NaF and $B_2O_3$, while the graphs B and C represent the spectra obtained from the conventional phosphors using a composite flux composed of $Na_2CO_3$, $K_2HPO_4$ and $B_2O_3$ in the manufacturing process.

As a result of the measurements, it has become apparent that the luminance of the phosphor according to the present invention is upgraded by about 4–7% compared with that of the conventional ones.

Figure 2:
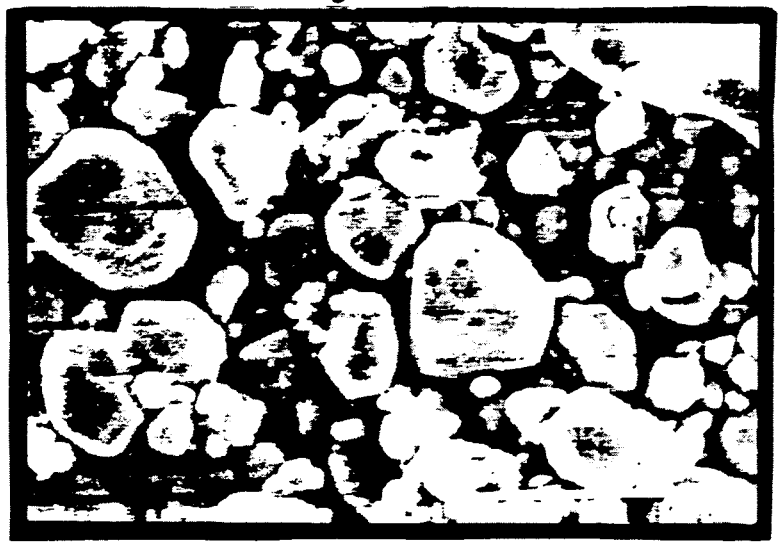
FIG. 2 is an electron micrograph (by a scanning electron microscope) (SEM) showing the particle shapes of a conventional phosphor manufactured through the use of a composite flux composed of $Na_2CO_3$, NaF and $H_3BO_3$.
Figure 3:
FIG. 3 is an electron micrograph (by SEM) showing the particle shapes of a conventional phosphor manufactured through the use of a composite flux composed of $Na_2CO_3$, $K_2HPO_4$ and $B_2O_3$.
Figure 4:
FIG. 4 is an electron microscope (by SEM) showing the particle shapes of the phosphor according to the present invention.

FIGS. 2, 3 and 4 are electron micrographs (by SEM) showing the particle shapes of phosphors, and of them, FIG. 2 and 3 illustrate the case of the conventional phophors manufactured through the use of composite fluxes composed of $Na_2CO_3$, NaF and $H_3BO_3$, and composed of $Na_2CO_3$, $K_2HPO_4$ and $B_2O_3$, while FIG. 4 shows the particle shapes of the phosphor according to the present invention. According to these electron micrographs as shown in the drawings, the phosphor according to the present invention shows a far more uniform particle size distribution compared with that of the conventional ones, and the particle shapes are also more desirable in the phosphor of the present invention.

First, raw materials such as yttrium oxide ($Y_2O_3$) and europium oxide ($Eu_2O_3$) are sufficiently mixed with fluxes such as $Na_2CO_3$ (in the amount of 2–6 g per 100 g of $Y_2O_3$), NaF (in the amount of 2–6 g per 100 g of $Y_2O$ 3 (in the amount of 0.5–1.0 g per 100 g of $Y_2O_3$) through the use of a dry method or by using proper solvent. The mixture is transferred into a heat resistant container, then a baking is carried out at a temperature of 1300°–1400° C., a washing is carried out using water, and then, a drying is carried out, thereby obtaining the phosphor of the present invention.

The actual examples of the present invention will be described below.

| Example 1 | |
|---|---|
| Yttrium oxide ($Y_2O_3$) | 100 g |
| Europium oxide ($Eu_2O_3$) | 6.5 g |
| Sodium carbonate ($Na_2CO_3$) | 5 g |
| Sodium fluoride (NaF) | 4 g |
| Boron oxide ($B_2O_3$) | 0.9 g |

The above raw materials were sufficiently mixed, the mixture was put into a heat resistant container, a baking was carried out at a temperature of 1400° C. for three hours, a washing was carreed out, and a drying was carried out. The phosphor manufactured through the above described process showed a luminance improved by 7% over the conventional phosphors.

| Example 2 | |
|---|---|
| Yttrium oxide ($Y_2O_3$) | 100 g |
| Europium oxide ($Eu_2O_3$) | 6.5 g |
| Sodium carbonate ($Na_2CO_3$) | 4 g |
| Sodium fluoride (NaF) | 3 g |
| Boron oxide ($B_2O_3$) | 1.0 g |

The above raw materials were sufficiently mixed, the mixture was put into a heat resistant container, a baking was carried out at a temperature of 1350° C. for two hours and thirty minutes, a washing was carried out, and a drying was carried out. The phosphor manufactured through the above process showed a luminance improvement by 6% over the conventional phosphors.

The $Y_2O_3$: Eu red phosphor according to the present invention is uniform in its particle size distribution, has a desirable spherical particle shape, shows a perfect filling state of the layer, and shows a luminance improvement by 4–7% over that of the conventional phosphors.

What is claimed is:

1. A method for manufacturing a $Y_2O_3$: Eu red phosphor from yttrium oxide ($Y_2O_3$) and europium oxide ($Eu_2O_3$) comprising the step of baking at a temperature of about 1300° to 1400° C. the yttrium oxides and europium oxides in a flux consisting essentially of a mixture of from 2 to 6 parts by weight of $Na_2CO_3$, from 2 to 6 parts by weight of NaF and from 0.5 to 1.0 parts by weight of $B_2O_3$ per 100 parts by weight of yttrium oxide.

* * * * *

UNITED STATES PATENT AND TRADEMARK OFFICE
CERTIFICATE OF CORRECTION

PATENT NO. : 5,055,226
DATED : October 8, 1991
INVENTOR(S) : Junmo Yang It is certified that error appears in the above-identified patent and that said Letters Patent is hereby corrected as shown below:

Column 2, line 24, delete "$Y_2O_3$" and insert therefor

-- $Y_2O_3$), and $B_2O_3$ --

Signed and Sealed this

Second Day of March, 1993

*Attest:*

STEPHEN G. KUNIN

*Attesting Officer*     *Acting Commissioner of Patents and Trademarks*